(12) United States Patent
Srikantha et al.

(10) Patent No.: US 11,436,506 B2
(45) Date of Patent: Sep. 6, 2022

(54) METHOD AND DEVICES FOR DETERMINING METROLOGY SITES

(71) Applicants: Carl Zeiss SMT GmbH, Oberkochen (DE); Carl Zeiss SMT Inc., Pleasanton, CA (US)

(72) Inventors: Abhilash Srikantha, Neu-Ulm (DE); Christian Wojek, Aalen (DE); Keumsil Lee, Palo Alto, CA (US); Thomas Korb, Schwaebisch Gmuend (DE); Jens Timo Neumann, Aalen (DE); Eugen Foca, Ellwangen (DE)

(73) Assignee: Carl Zeiss SMT GmbH, Oberkochen (DE)

( * ) Notice: Subject to any disclaimer, the term of this patent is extended or adjusted under 35 U.S.C. 154(b) by 396 days.

(21) Appl. No.: 16/807,581

(22) Filed: Mar. 3, 2020

(65) Prior Publication Data
US 2020/0285976 A1 Sep. 10, 2020

Related U.S. Application Data

(60) Provisional application No. 62/814,446, filed on Mar. 6, 2019.

(51) Int. Cl.
*G06N 20/00* (2019.01)
*G06N 5/04* (2006.01)
(Continued)

(52) U.S. Cl.
CPC ........... *G06N 5/04* (2013.01); *G06K 9/00536* (2013.01); *G06K 9/6217* (2013.01); *G06N 20/00* (2019.01);
(Continued)

(58) Field of Classification Search
CPC ...... G01N 21/65; G01N 23/046; G01N 23/06; G01N 23/22; G01N 2223/03;
(Continued)

(56) References Cited

U.S. PATENT DOCUMENTS 8,285,031 B2 * 10/2012 Kitamura ............... G06T 7/001
382/199
2007/0268497 A1 * 11/2007 Stanke ............... G03F 7/70525
356/625

(Continued)

FOREIGN PATENT DOCUMENTS

WO  WO-2017205537 A1 * 11/2017  ......... G01N 21/9501
WO  WO-2020035516 A1 *  2/2020  ......... G03F 7/70616

OTHER PUBLICATIONS

Baatz, Georges, et al. "Leveraging topographic maps for image to terrain alignment." 3DIMPVT, 2012.
(Continued)

*Primary Examiner* — Mark R Gaworecki
(74) *Attorney, Agent, or Firm* — Fish & Richardson P.C.

(57) ABSTRACT

Methods for determining metrology sites for products includes detecting corresponding objects in measurement data of one or more product samples, and aligning the detected objects are aligned. The methods also include analyzing the aligned objects, and determining metrology sites based on the analysis. Devices use such methods to determine metrology sites for products.

27 Claims, 8 Drawing Sheets

(51) Int. Cl.
G06K 9/00 (2022.01)
G06V 10/82 (2022.01)
G06K 9/62 (2022.01)
G01N 23/06 (2018.01)
G01N 23/046 (2018.01)
G01N 23/22 (2018.01)
G01N 21/65 (2006.01)
G06N 3/04 (2006.01)
G06N 3/08 (2006.01)

(52) U.S. Cl.
CPC ............ G06V 10/82 (2022.01); G01N 21/65 (2013.01); G01N 23/046 (2013.01); G01N 23/06 (2013.01); G01N 23/22 (2013.01); G01N 2223/03 (2013.01); G01N 2223/045 (2013.01); G01N 2223/07 (2013.01); G01N 2223/418 (2013.01); G01N 2223/419 (2013.01); G06K 9/6254 (2013.01); G06K 9/6256 (2013.01); G06N 3/0454 (2013.01); G06N 3/08 (2013.01); G06V 2201/06 (2022.01)

(58) Field of Classification Search
CPC ......... G01N 2223/045; G01N 2223/07; G01N 2223/418; G01N 2223/419; G06K 9/00536; G06K 9/6217; G06K 9/6254; G06K 9/6256; G06N 3/0454; G06N 3/0472; G06N 3/08; G06N 5/04; G06N 20/00; G06V 10/755; G06V 10/82; G06V 2201/06
See application file for complete search history.

(56) References Cited

U.S. PATENT DOCUMENTS

| | | | | |
|---|---|---|---|---|
| 2017/0287751 | A1* | 10/2017 | Kuznetsov | G03F 7/70633 |
| 2018/0349538 | A1* | 12/2018 | Bhosale | G06F 30/398 |
| 2019/0041202 | A1* | 2/2019 | Saraswatula | G06N 3/08 |
| 2020/0134829 | A1* | 4/2020 | Flanagan | G06T 7/174 |

OTHER PUBLICATIONS

Babenko, Boris, Ming-Hsuan Yang, and Serge Belongie, "Visual tracking with online multiple instance learning." CVPR. 2009.
Beluch, William H., et al. "The power of ensembles for active learning in image classification." CVPR. 2018.
Brox, Thomas, et al. "High accuracy optical flow estimation based on a theory for warping", ECCV. 2004.
Cootes, Timothy F., et al. "Active shape models-their training and application." CVIU. 1995.
Cootes, Timothy F., Gareth J. Edwards, and Christopher J. Taylor. "Active appearance models." PAMI. 2001.
D. J. Williams and M. Shah, "A fast algorithm for active contours and curvature estimation," CVGIP: Image Understanding, 1992.
Dollár, Piotr, and C. Lawrence Zitnick. "Structured forests for fast edge detection." ICCV. 2013.
Fischler, Martin A., and Robert C. Bolles. "Random sample consensus: a paradigm for model fitting with applications to image analysis and automated cartography," ACM, 1981.
Goodfellow, Ian, et al. "Generative adversarial nets." NIPS. 2014.
Han, Kai, et al. "SCNet: Learning semantic correspondence." arXiv, 2017.
Hartigan, John A., and Manchek A. Wong. "Algorithm AS 136: A k-means clustering algorithm." Journal of the Royal Statistical Society. 1979.
Heger, Stefan, et al. "User-interactive registration of bone with A-mode ultrasound." MBM. 2005.
Liu, Wei," SSD: Single Shot MultiBox Detector ", ECCV 2016.
Karpathy, Andrej, and Li Fei-Fei. "Deep visual-semantic alignments for generating image descriptions." CVPR. 2015.
Kendall, Alex, Vijay Badrinarayanan, and Roberto Cipolla, "Bayesian segnet: Model uncertainty in deep convolu-tional encoder-decoder architectures for scene understanding," arXiv .2015.
Long, Jonathan, Evan Shelhamer, and Trevor Darrell. "Fully convolutional networks for semantic segmentation." CVPR. 2015.
Milborrow, Stephen, and Fred Nicolls. "Locating facial features with an extended active shape model." ECCV. 2008.
P.J. Besl and N.D. McKay, "A method for registration of 3D shapes", PAMI. 1992.
Pani Paudel, Danda, Adlane Habed, and Luc Van Gool. "Optimal transformation estimation with semantic cues." ICCV. 2017.
Pennec, Xavier, Pascal Cachier, and Nicholas Ayache. "Understanding the "demon's algorithm": 3D non-rigid registration by gradient descent." MICCAI. 1999.
Peyre, Julia, et al. "Weakly-supervised learning of visual relations." ICCV. 2017.
Prest, Alessandro, et al. "Learning object class detectors from weakly annotated video." CVPR. 2012.
Raina, Rajat, et al. "Self-taught learning: transfer learning from unlabeled data", ACM 2007.
Santner, Jakob, Thomas Pock, Horst Bischof. Interactive Multi-Label Segmentation. ACCV 2010.
Shrivastava, Ashish, et al. "Learning from Simulated and Unsupervised Images through Adversarial Training." CVPR. 2017.
Simo-Serra, Edgar, et al. "Discriminative learning of deep convolutional feature point descriptors." ICCV. 2015.
Snoek, Cees GM, Marcel Worring, and Arnold WM Smoulders. "Early versus late fusion in semantic video analysis." ACM. 2005.
Wachinger, Christian, and Nassir Navab. "Entropy and Laplacian images: Structural representations for multi-modal registration." MIA. 2012.
Yao, Angela et al. Interactive Object Detection, CVPR 2012.

* cited by examiner

METHOD AND DEVICES FOR DETERMINING METROLOGY SITES

CROSS-REFERENCE TO RELATED APPLICATION

This application claims priority under 35 USC 119(e) to U.S. Provisional Application No. 62/814,446, filed Mar. 6, 2019. The contents of this application is hereby incorporated by reference in its entirety.

FIELD

The present application relates to methods and devices for determining metrology sites for example for product inspection.

BACKGROUND

An important aspect of industrial production is to ensure the quality of the manufactured products. In many technical fields, this is achieved by measuring a set of predefined physical aspects of each product and verifying if these physical aspects are within acceptable predefined ranges. Depending on the kind of products, different physical aspects may be used. A physical aspect as used herein relates to any measurable physical quantity. For example, depending on the kind of products the physical aspects may be certain dimensions of the products, physical properties of the product like elasticity or hardness, optical properties like absorption, electrical properties, etc.

In some technical fields, assuming a Gaussian distribution of the measured physical aspects, the predefined range is typically standardized by a three sigma range (three standard deviations about a nominal value), which ensures a maximum of 1.5 defective parts per million. However, depending on the field of technology, other standards may also be applied. This measuring of the set of predefined physical aspects and verifying if they lie within the predefined range is important for example for risk management and cost benefit analysis and/or quality control.

For measuring such a set of predefined physical aspects, metrology sites can be defined which indicate what to measure where on the product, for example which physical dimensions of the product have to be measured, or which other physical aspects are to be measured where on the product. A set of such metrology sites is also referred to herein as a metrology blueprint. Conventionally, such metrology sites are defined manually by experienced human operators. For example, such an operator may inspect two-dimensional images of a sample set of products and decide on metrology sites based on this inspection. Even with two-dimensional images, this may present quite a challenge. For example, scaling a manual analysis of a few sample products to huge volume production may introduce uncertainties. Moreover, while analysis of two-dimensional images by an experienced human operator may be feasible, such an analysis becomes much more difficult when other measurement techniques of physical aspects like three-dimensional imaging, spectroscopy or even combinations of such measurements are used.

SUMMARY

The present application seeks to provide for techniques supporting the definition of metrology sites.

A general aspect of the disclosure provides a method for determining metrology sites for a product. The method includes, on a computing device:

detecting a plurality of corresponding objects in measurement data obtained from one or more product samples;

aligning the plurality of corresponding objects;

analyzing the aligned objects; and determining metrology sites based on the analyzing.

Such object detection and alignment facilitates a following analysis in an at least partially automatic manner.

The term object refers to any defined set of features in the measurement data.

Corresponding objects are objects which are similar to each other, for example similar in shape.

The measurement data may include one or more of a two-dimensional image, a three-dimensional image, scanning electron microscopy measurement data, computer tomography measurement data, spectroscopic measurement data or acoustic measurement data.

Therefore, various types of measurement may be used singly or in combination.

Detecting the plurality of objects may include a template matching process.

Detecting the plurality of objects may also be based on machine learning.

This may result in more robust object detection in some implementations.

The method may further include providing an interface for human input in a training part of machine learning. This can enable annotation of training samples by a human operator.

Aligning the plurality of objects may include bringing the plurality of objects into a common reference coordinate system. This may facilitate the subsequent analysis.

Aligning the plurality of objects may also include finding corresponding descriptors in the plurality of objects.

Corresponding descriptors are descriptors marking corresponding features in the plurality of objects.

Finding the descriptors may be based on machine learning techniques.

The method may further include providing an interface for human input in a training part of machine learning for finding the descriptors.

Analyzing the plurality of aligned objects includes identifying regions of different variations, e.g. high and low variances between the plurality of objects.

"High" and "low" variances are to be seen relative to each other, i.e. regions of higher variations vary more between the plurality of aligned objects than the region of lower variations.

Identifying the regions of different variations may include analyzing shape, contour, mesh and/or texture of the plurality of objects.

Identifying the regions of different variations may include performing a principal component analysis.

The method may further include visualizing the regions of different variances. Identifying variances supports defining metrology sites, either automatically or by a human operator.

The visualizing may include generating one of a heat map or a saliency map.

Determining the metrology sites may include determining the metrology sites based on the regions of different variances.

Analyzing the plurality of aligned objects may also include performing a segmentation of the plurality of aligned objects based on semantic understanding, e.g. using machine learning.

The semantic understanding may be based on semantic information including one or more of a functionality of an object region, a material type of an object, a geometry type of an object region, surface properties of an object region or prior metrology information.

The method may further include fitting predefined elements to the segmented objects.

Fitting predefined elements to the identified segments supports the definition of metrology sites.

The predefined elements may include geometric elements.

Determining metrology sites may include at least one of selecting dimensions of the predefined elements or dimensions between the predefined elements.

Determining metrology sites may include solving a constraint optimization problem. In this way metrology sites may be automatically detected.

Determining metrology sites may be based on machine learning.

The method may further include providing an interface for human input in a training part of machine learning for determining metrology sites.

At least one of the object detection, aligning, analyzing or determining metrology sites may use prior knowledge from previous measurements.

At least one of the object detection, alignment, analysis or determining metrology sites may include performing a classification using a trained classifier, e.g. trained using machine learning. For example, a discriminative classifier may be used.

A general aspect of the disclosure provides an analysis device (e.g., a computer) that includes a processor configured to perform any the methods discussed above.

A general aspect of the disclosure provides a computer program that includes instructions which, when the program is executed by a computer, cause the computer to carry out any of the methods discussed above.

A general aspect of the disclosure provides a data carrier signal carrying the computer program disclosed in the preceding paragraph.

A general aspect of the disclosure provides a tangible computer readable storage medium that includes instructions which, when executed by a computer, cause the computer to carry out any of the methods discussed above.

The above summary gives merely a brief overview over some embodiments and is not to be construed as limiting the scope of the present application in any way.

DETAILED DESCRIPTION

In the following, various embodiments will be described in detail referring to the attached drawings.

These embodiments are given for illustrative purposes and are not to be construed as limiting. While numerous details are described, this does not imply that all these details have to be present in embodiments, as in some embodiments some of the details may be omitted or replaced by alternative features or elements.

Features from various embodiments may be combined to form further embodiments. Variations and modifications described with respect to one of the embodiments may also be applied to other embodiments and will therefore not be described repeatedly.

Various embodiments described in the following relate to the determination of one or more metrology sites, which then may be used for example for product inspection in an industrial production process.

Figure 1:
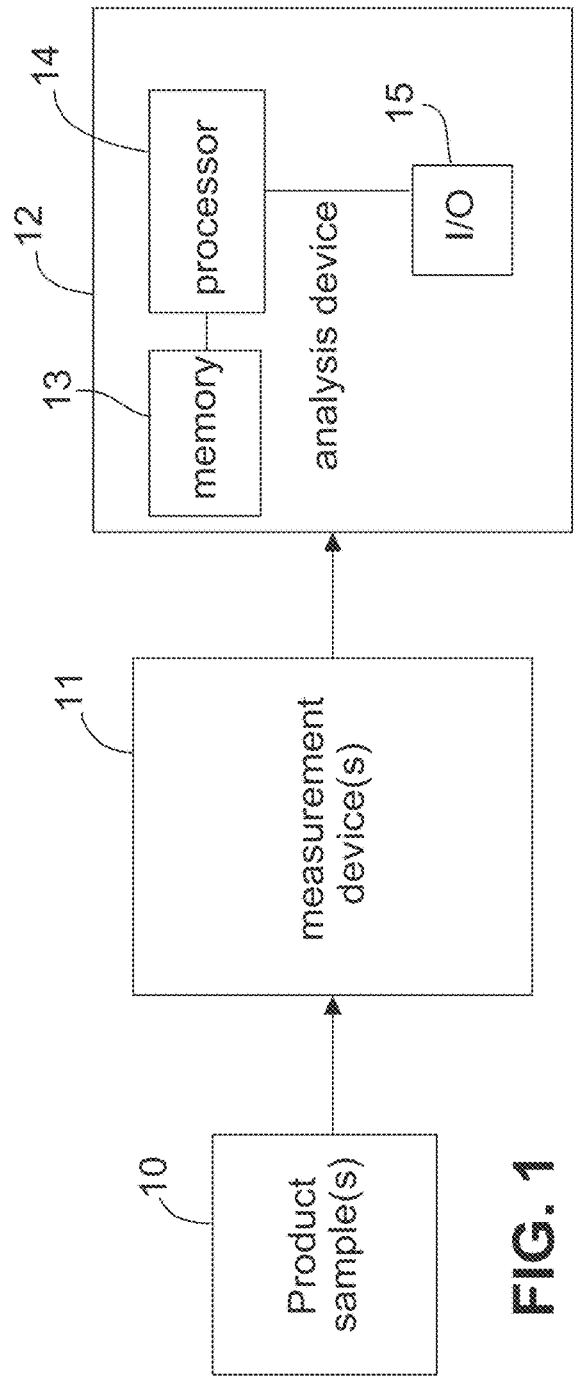
FIG. 1 is a block diagram of a device according to an embodiment.

FIG. 1 illustrates an analysis device 12 according to an embodiment. Analysis device 12 serves to determine metrology sites for a product.

To determine the metrology sites, one or more samples 10 of the respective product are measured by one or more measurement devices 11. As an example, the product may be a processed semiconductor wafer having semiconductor or other structures formed thereon. In this case, one or more samples of this wafer may be provided, which are measured by one or more measurement devices like two-dimensional imaging devices, three-dimensional imaging devices or spectroscopy devices. Such imaging devices may include scanning electron microscopy devices which may produce a two-dimensional surface image or may be used to provide a three-dimensional surface topology in case of 3D scanning electronic microscopy, and/or may include spectroscopy devices like Raman spectroscopy devices, X-Ray microscopes or photoluminescence spectroscopy devices. Such different types of measurements are also referred to as different modalities herein. In other embodiments, the product may be a mechanical product like a motor block, and the one or more measurement devices 11 may include a computer tomography (CT) device providing a three-dimensional image of the motor block. These are only some non-limiting examples, and techniques disclosed herein also may be applied to other kinds of products and measurement devices. It should be noted that also in some embodiments combinations of different measurements may be performed.

Measurement data of these product samples are provided to analysis device 12. Analysis device 12 may be implemented as a computer including for example one or more processors 14, a memory 13 and input/output devices 15 like keyboard, screen, mouse etc. This computer is then programmed accordingly to perform techniques as discussed below for providing metrology sites for the respective product. In other embodiments, some of the functions discussed below may be performed by specific hardware like application specific integrated circuits (ASICs), image processors, digital signal processors, field programmable gate arrays or the like. Generally, techniques discussed herein may be implemented by software, hardware, firmware or combinations thereof. In this respect, the term "processor" may relate to any entity capable of implementing the methods as discussed below.

Figure 2:
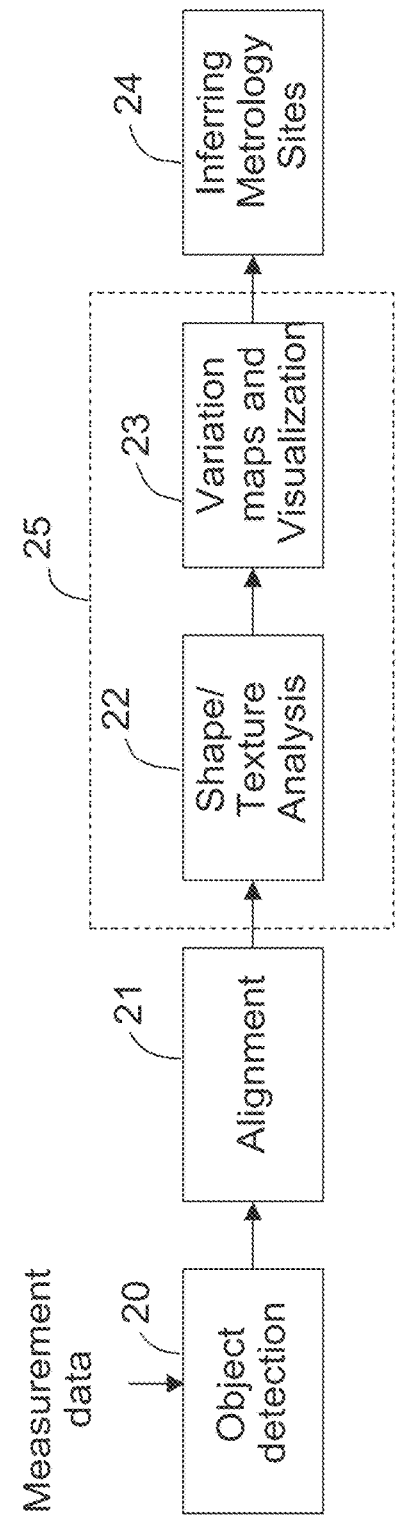
FIG. 2 is a flowchart of a method according to an embodiment.
Figure 3:
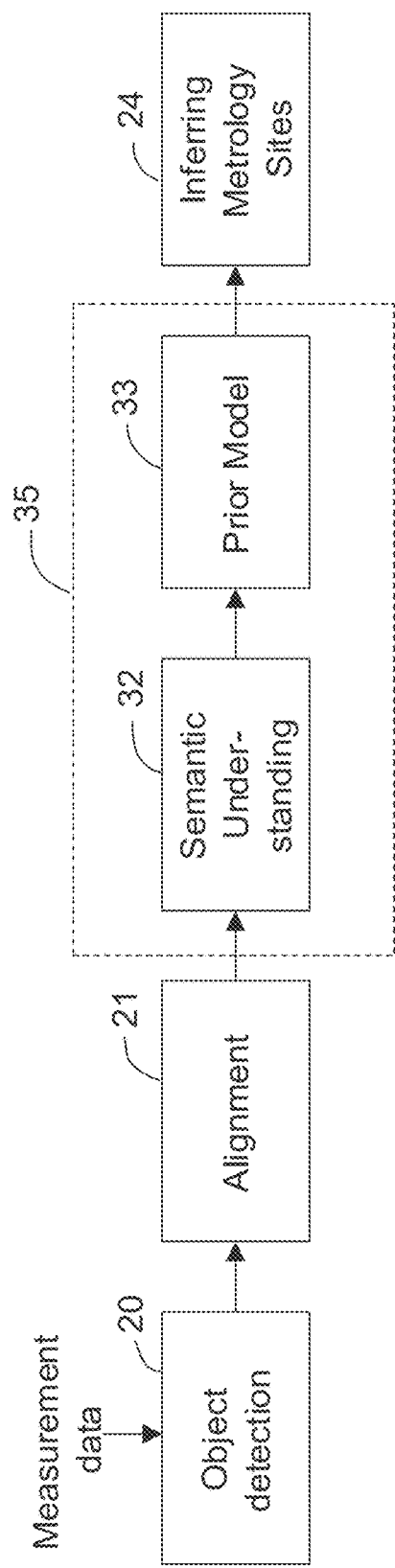
FIG. 3 is a flowchart of a method according to an embodiment.

Analysis device 12 performs methods according to embodiments as will now be explained referring to FIGS. 2 and 3 to determine metrology sites. By using analysis device 12, the need for a human operator to define metrology sites may be reduced, or metrology sites may even be defined fully automatically. FIGS. 2 and 3 show flowcharts illustrating two different embodiments of methods for inferring metrology sites for a product, which may be performed on analysis device 12. Steps common to the methods of FIGS. 2 and 3 bear the same reference numeral and will not be described repeatedly.

For better understanding, the methods of FIGS. 2 and 3 will be described using examples shown in FIGS. 5A to 5G. The examples of FIGS. 5A to 5G serve merely to provide a better understanding of the methods shown and is not to be construed as limiting, as the methods of FIGS. 2 and 3 are also applicable to other products and measurements than the ones used as an example for FIGS. 5A to 5G.

First, the method of FIG. 2 will be described.

The various steps described with respect to FIG. 2 may be performed with or without human intervention. For example, in some embodiments steps are fully automated, such that no human intervention is needed. In other embodiments, human intervention may be used to supervise the result of an automatic process. In still other embodiments, some of the steps may be performed by human intervention with no or only a low degree of automatization, whereas other steps may be automatized.

The method of FIG. 2 as an input receives measurement data of one or more product samples from one or more measurement devices, for example from measurement devices 11 of FIG. 1. On the measurement data, at 20 an object detection is performed. Object detection as used herein refers to identifying objects, which may be regions of interest, in the measurement data. In particular, the object detection may be used to detect repeating structures in the measurement data, for example in the measurement data of one product in case the product itself includes such repeating structures, or in the measurement data over a plurality of products. It should be noted that the term "object" in object detection does not necessarily refer to a physical object, but generally refers to certain features or group of features in the measurement data. For example, in case of spectroscopic measurements, objects may be similar or identical parts of spectra detected from various product samples.

Several approaches may be used to implement the object detection at 20. In some implementations, template matching techniques as described for example in Holzer, Stefan et al. "Distance transform templates for object detection and pose estimation" CVPR 2009 may be used. Such template matching techniques provide a template, which is then searched for in the measurement data for example by forming and evaluating cross correlations. In other embodiments machine learning techniques (e.g. as described in Yao, Angela et al. "Interactive Object Detection", CVPR 2012) are used to train analysis device 12 to perform the object detection at 20. Machine learning is a generic term related to algorithms and statistical models that computer systems use to progressively improve their performance on a specific task. Machine learning generally uses training data to train a device according to this specific task. For example, an artificial neural network or other model may be trained using the training data to then perform the respective task, in this case to perform the object detection at 20.

Figure 4:
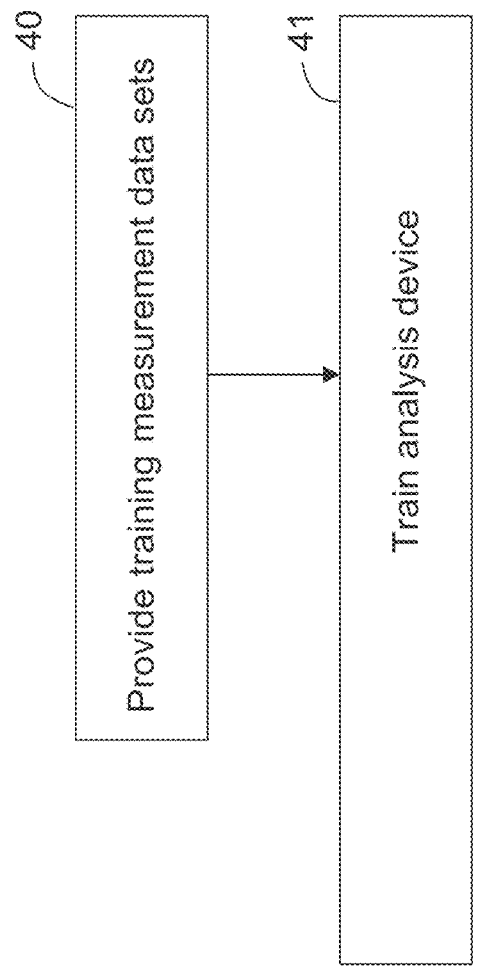
FIG. 4 is a flowchart illustrating a method for training an analysis device according to some embodiments.

This is generically shown in FIG. 4. At 40 in FIG. 4, training measurement data sets are provided to an analysis device. For example, the training measurement data sets may include information which objects are to be detected, and in this way at 41 the analysis device may be trained for object detection.

A simple machine learning technique is so-called supervised learning, which is for example described in Wei Liu, "SSD: Single Shot MultiBox Detector", ECCV 2016. Here, a neural network or other modeling entity is trained on training measurement data sets where the objects to be detected are annotated, for example annotated by a human operator. Thus trained, the analysis device is able to perform an object detection on the measurement data automatically.

Apart from supervised learning, other machine learning techniques may also be used, like transfer learning as described for example in Raina, Rajat, et al. "Self-taught learning: transfer learning from unlabeled data", ACM 2007 or interactive learning as described in Yao, Angela, et al., "Interactive object detection", CVPR 2012. During transfer learning, a generic pre-trained model (for example neural network or other approach) is fine-tuned over a few annotated training data sets of interest. A model, in this respect, refers to an entity which is trained and then performs the task it was trained for, for example a neural network.

In interactive learning, annotation and model learning is interleaved such that a human operator annotates only "difficult" examples, e.g. cases where objects are hard to detect.

Annotating or annotation, in this respect, refers to the process of providing data sets used for training with additional information, for example the desired result, in this case of the object detection. For example, objects to be detected may be marked in the training data sets.

Active learning as described for example in Beluch, William H., et al. "The power of ensembles for active learning in image classification." CVPR, 2018 aims at learning robust policies to detect "difficult" examples using for example model uncertainty, as described in Kendall, Alex, Vijay Badrinarayanan, and Roberto Cipolla, "Bayesian segnet: Model uncertainty in deep convolu-tional encoder-decoder architectures for scene understanding." arXiv. 2015. For the interaction of a human operator with the training, for example the annotation as described above, input/output components 15 of analysis device 12 of FIG. 1 may be used. In some embodiments, a graphical user interface (GUI) may be used. Other machine learning techniques than the ones discussed above may also be provided.

Reducing time of human operators for the above-mentioned annotation while training may also be achieved by reduced granularity or increased abstraction. This means that instead of annotating structures to be identified in the object detection in training samples, in some instances only more generic annotations are given. For example, in some instances only the presence or absence of objects to be detected in training data may be given, without identifying the objects themselves. For this, techniques like multiple instance learning as described in Babenko, Boris, Ming-Hsuan Yang, and Serge Belongie, "Visual tracking with online multiple instance learning." CVPR. 2009, weekly supervised learning as described in Prest, Alessandro, et al. "Learning object class detectors from weakly annotated video." CVPR. 2012 and reinforcement learning as described in Sutton, Richard S., and Andrew G. Barto, "Introduction to reinforcement learning", Vol. 135. Cambridge: MIT press, 1998, may be utilized.

Figure 5A:
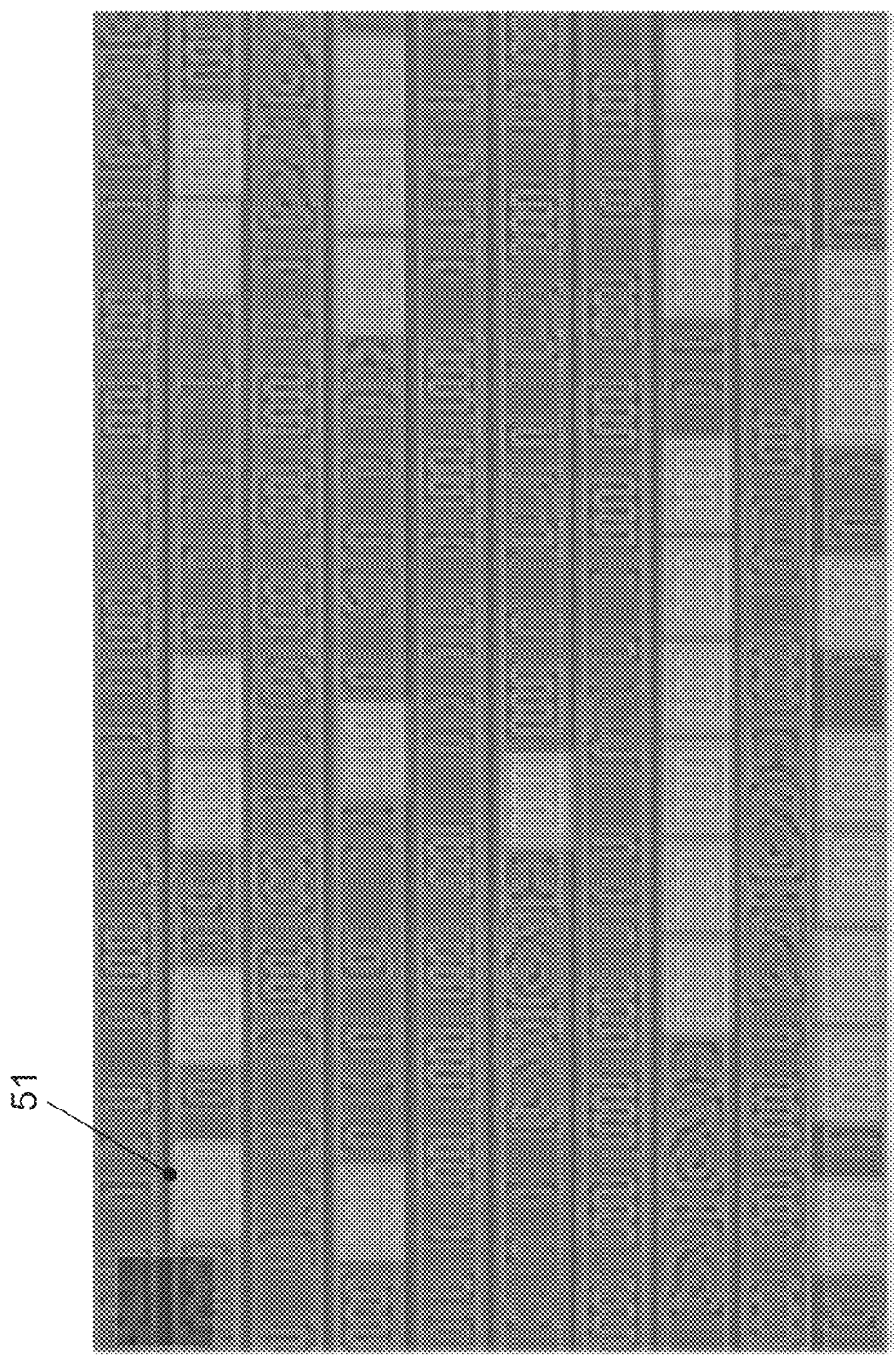
FIGS. 5A to 5G show examples for illustrating methods according to some embodiments.

To further illustrate, FIG. 5A shows an image of an example product, for example a semiconductor wafer, on which various structures are formed. Structures 51 are provided at several places on the wafer and may be recognized by object detection at 20 in FIG. 2 as corresponding objects. This is an example where repeating structures are present on a single product. In other instances, repeating structures may be detected over a plurality of samples. For ease of illustration, in FIG. 5A and also in FIGS. 5B to 5G described further below two-dimensional imaging is used as an example measurement. In other embodiments, measurement techniques like three-dimensional imaging, thermal measurements, acoustic measurements, spectroscopy measurements, computer tomography and combinations thereof may be used, just to give a few examples.

Returning to FIG. 2, following the object detection at 20, at 21 an alignment procedure is performed. In such an alignment procedure, the objects detected at 20 are brought to a common reference frame, for example a common coordinate system, to be able to better detect variations between the detected objects. This alignment is also referred to as registration. For this alignment, descriptors, which may also be referred to as features in the various objects detected, are identified, for example key points as described in Simo-Serra, Edgar, et al. "Discriminative learning of deep convolutional feature point descriptors." ICCV. 2015, edge information as described in Dollar, Piotr, and C. Lawrence Zitnick. "Structured forests for fast edge detection." ICCV. 2013, or point clouds as described in P. J. Besl and N. D. McKay, "A method for registration of 3D shapes", PAMI. 1992, semantic labels as in Baatz, Georges, et al. "Leveraging topographic maps for image to terrain alignment." 3DIMPVT, 2012, or multimodel inputs as in Wachinger, Christian, and Nassir Navab. "Entropy and Laplacian images: Structural representations for multi-modal registration." MIA. 2012. An example of multimodal inputs are for example scanning electron microscopy scans together with a reference CAD model which gives essentially a "nominal" form.

The registration is then essentially performed by finding corresponding descriptors in each object identified at 20. Also for this alignment at 21, machine learning techniques may be used to train analysis device 12 to perform the alignment. For example, supervised learning as described in Simo-Serra, Edgar, et al. "Discriminative learning of deep convolutional feature point descriptors." ICCV. 2015, unsupervised learning as described in Peyre, Julia, et al. "Weakly-supervised learning of visual relations." ICCV. 2017 or Han, Kai, et al. "SCNet: Learning semantic correspondence." arXiv, 2017, interactive approaches as described in Heger, Stefan, et al. "User-interactive registration of bone with A-mode ultrasound." MBM. 2005, iterative methods as described in P. J. Besl and N. D. McKay, "A method for registration of 3D shapes", PAMI, 1992, optical flow methods as described in Brox, Thomas, et al. "High accuracy optical flow estimation based on a theory for warping", ECCV, 2004 and non-rigid methods, like DEMON's algorithm as described in Pennec, Xavier, Pascal Cachier, and Nicholas Ayache. "Understanding the "demon's algorithm": 3D non-rigid registration by gradient descent." MICCAI. 1999 may be used. Robustness against noisy descriptors in some embodiments may be improved through methods such as RANSAC, described in Fischler, Martin A., and Robert C. Bolles. "Random sample consensus: a paradigm for model fitting with applications to image analysis and automated cartography." ACM. 1981, and adversarial learning as described in Shrivastava, Ashish, et al. "Learning from Simulated and Unsupervised Images through Adversarial Training." CVPR. 2017. Noisy descriptor refers to situations where the measurement data is noisy, such that exact descriptor matches are difficult to find. Again, besides the techniques described above, any conventional techniques, in particular machine learning techniques, may be used, and a graphical user interface (GUI) as described above may be provided so support the training and annotations by a human operator.

Figure 5B:
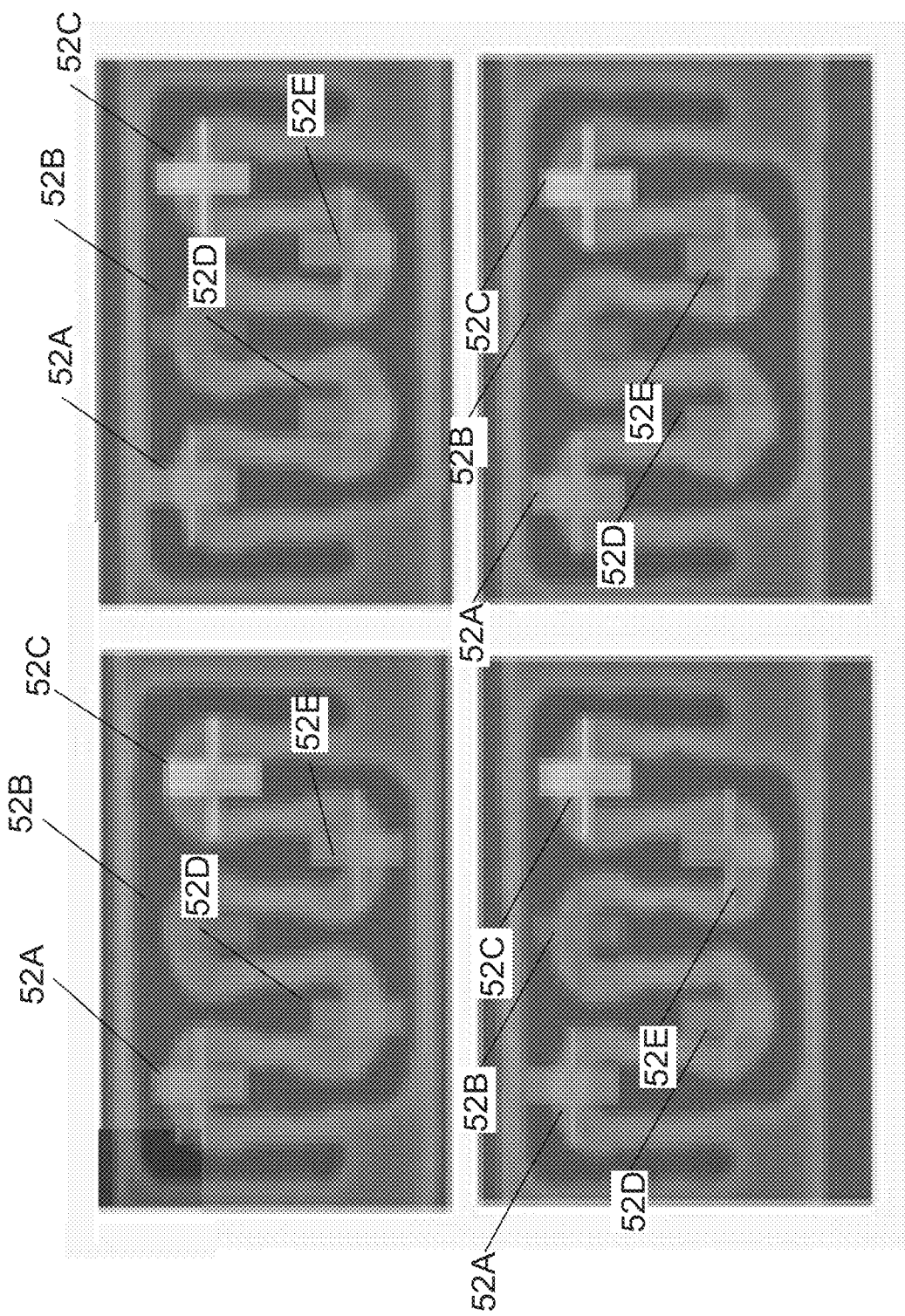

An example of such an alignment is illustrated in FIG. 5B. Here, for four of the structures 51 of FIG. 5A being an example of detected objects, points 52A to 52E are marked in each object at corresponding positions. These points 52A to 52E are an example for descriptors. By using these points 52A to 52E, the objects may be brought to a common reference frame. In a simple case, for example point 52A may be used as an origin of a two-dimensional coordinate system, and other ones of the points may be used to define axis directions of the coordinate system.

Over the aligned objects, then an analysis is performed at 25 in FIG. 2. The analysis at 25 is divided in a shape and/or texture analysis at 22, followed by a visualization at 23.

The shape or texture analysis at 22 examines the aligned objects to identify regions of high and low variations between the objects. These variations in some embodiments may be detected by analyzing the shape, for example contour or mesh in case of a three-dimensional mesh of the objects. Such a contour/mesh analysis is for example described in Milborrow, Stephen, and Fred Nicolls. "Locating facial features with an extended active shape model." ECCV. 2008. It should be noted that such a shape detection may also be performed if the objects are not physical objects, but for example features of spectra or the like. In this case, the shape of spectra may be described. An example for contour/mesh analysis is given in Milborrow, Stephen, and Fred Nicolls. "Locating facial features with an extended active shape model." ECCV. 2008. Alternatively or additionally, the texture of the objects may be examined for variations. Such a texture analysis is explained in Cootes, Timothy F., Gareth J. Edwards, and Christopher J. Taylor. "Active appearance models." PAMI. 2001. Texture, in this respect, refers to the appearance of a surface, in particular smoothness or roughness of a surface of an object. Any other features may also be examined for variations.

The shape analysis at 22 may also be performed on data from multiple modalities like fluorescence measurements, x-ray measurements, scanning electronic microscope measurements like MSEM (multi-scanning electronic microscopy using a plurality of beams in parallel). This data from a plurality of measurement sources may be treated through early or late fusion as described for example in Snoek, Cees GM, Marcel Worring, and Arnold WM Smeulders. "Early versus late fusion in semantic video analysis." ACM. 2005, or by learning a common representation as described for example in Karpathy, Andrej, and Li Fei-Fei. "Deep visual-semantic alignments for generating image descriptions." CVPR. 2015. In early fusion, shape analysis is performed on concatenated modalities whereas late fusion combines the analyses performed on individual modalities. Alternatively, a modality agnostic shape analysis can be performed using a common representation that describes data from any modality.

One approach to analyze the shapes and textures is using principal component analysis (PCA). Principle component analysis is a statistical procedure that uses an orthogonal transformation to convert a set of observations of possible correlated variables into a set of values of linearly uncorrelated variables called principle components. The variables can be textures as described for example in Cootes, Timothy F., Gareth J. Edwards, and Christopher J. Taylor. "Active appearance models." PAMI. 2001. or shapes as described for example in Cootes, Timothy F., et al. "Active shape models-their training and application." CVIU. 1995. The principle components resulting from this analysis indicate directions of maximum variance of the input data, in this case the objects, indicating corresponding variations. In other approaches, a basis representing variances may be learned from the aligned objects using machine learning techniques. Further, shape alignment in some embodiments may also be based on specific variations of interest e.g. semantic labels as in Pani Paudel, Danda, Adlane Habed, and Luc Van Gool. "Optimal transformation estimation with semantic cues." ICCV. 2017.

Figure 5C:
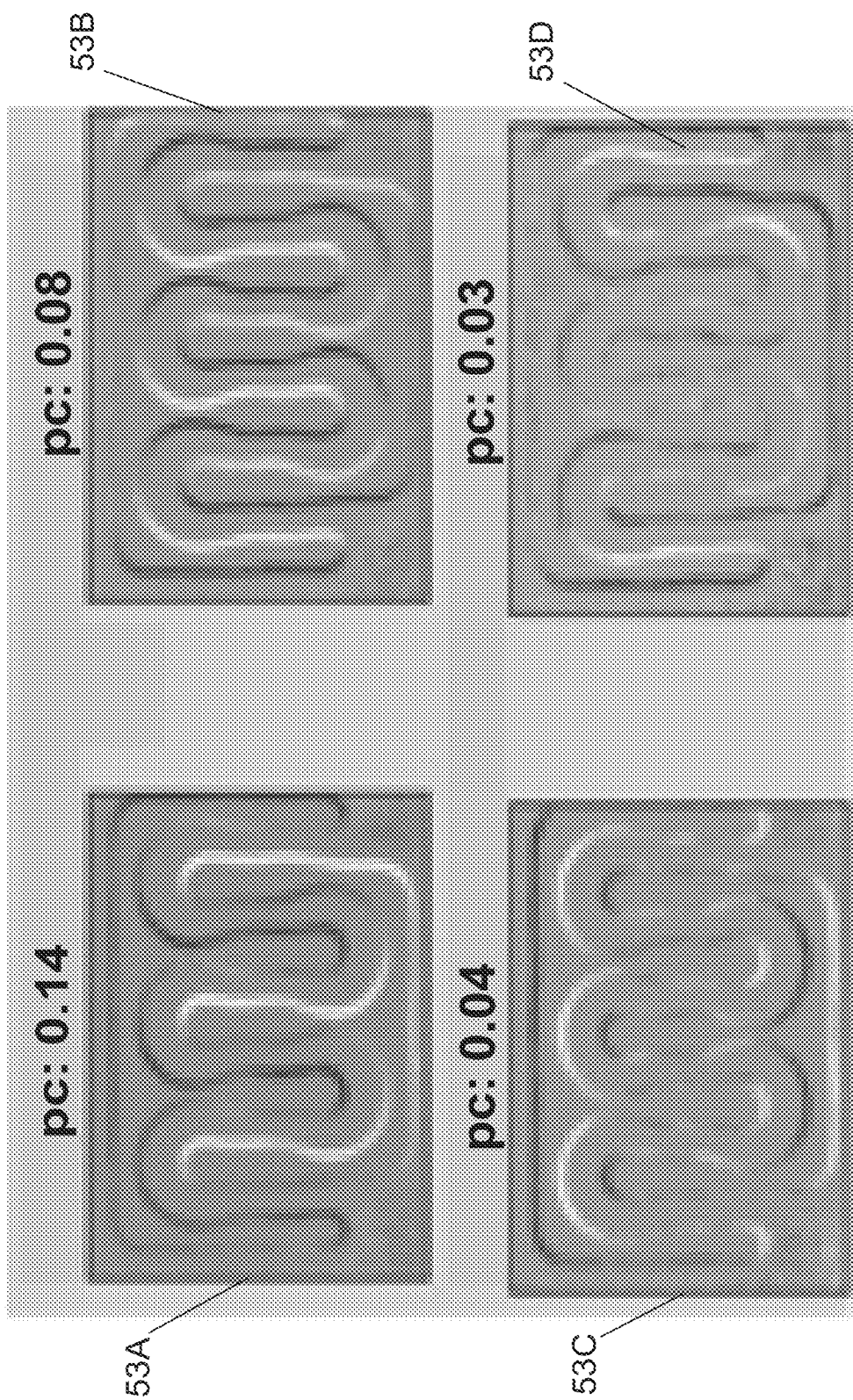
Figure 5D:
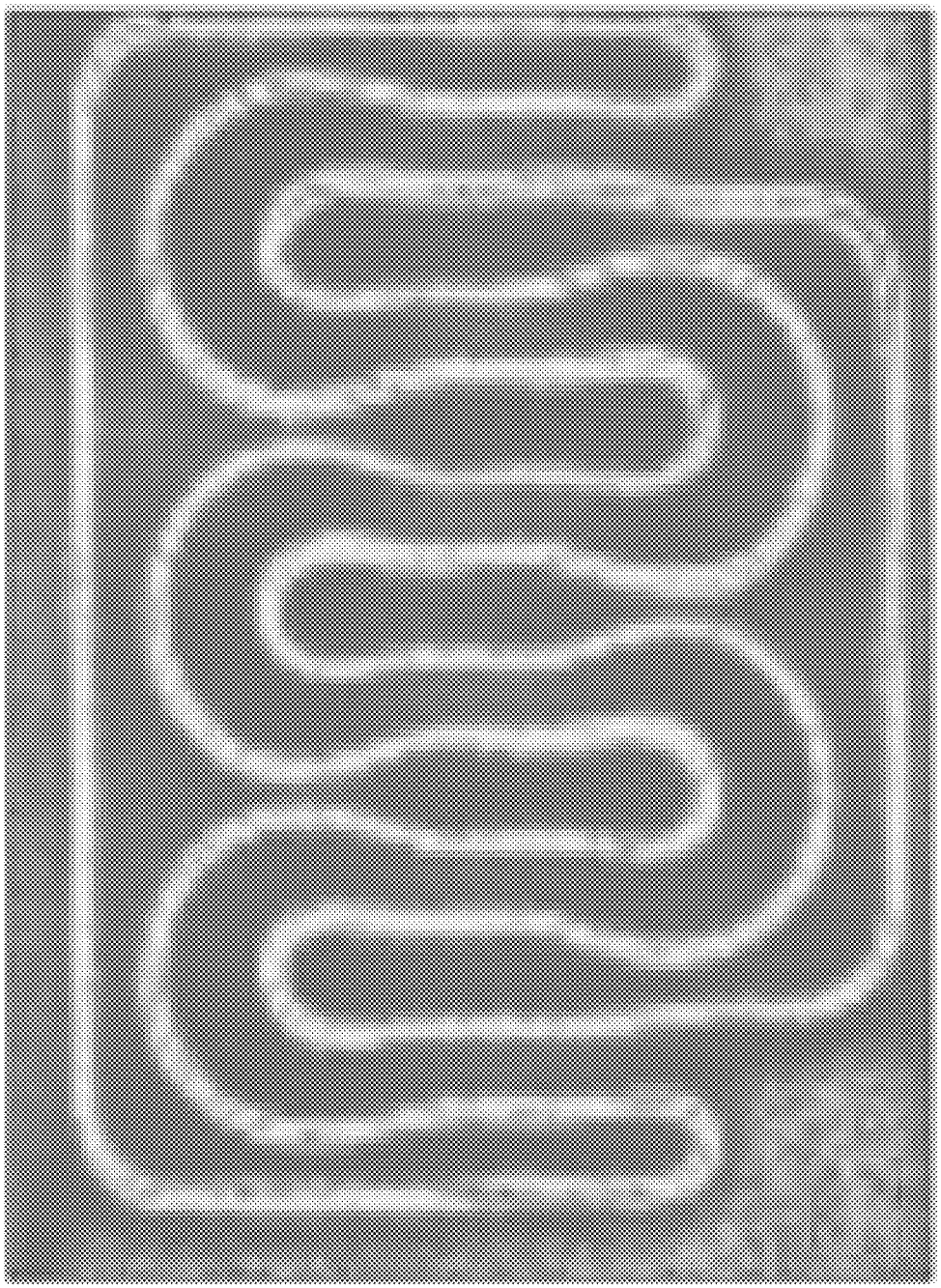

FIG. 5C shows an example for the result of a principle component analysis for different principle values pc as 53A, 53B, 53C and 53D. These components shown are essentially basis vectors of the principle component analysis, which can be combined in linear combinations to obtain the original objects. The shapes shown at 53A, 53B, 53C and 53D indicate regions of shape variations between objects. Here, whiter regions exhibit higher variation. The variations thus detected may then be visualized for example in a heat map as shown in FIG. 5D. Here, different colors show regions of high and low variances. Therefore, in this case through an analysis by analysis device 13 a human operator may be provided with a visual indications where strong variances in the product may occur. A heat map is only one example for a visualization, and other ways of representation like saliency maps are also possible. For representation, some low-dimensional representation of the data, for example from clustering as described in Hartigan, John A., and Manchek A. Wong. "Algorithm AS 136: A k-means clustering algorithm." Journal of the Royal Statistical Society. 1979, may be used in particular in case of complex data from different measurements. Correspondingly, also low-dimensional representation of the variations obtained at 22 may be used. Such variations may also be summarized by sampling from learned generative models like GANs, as described in Goodfellow, Ian, et al. "Generative adversarial nets." NIPS. 2014. In some embodiments, only variations of interest and not all variations may be visualized. For instance, variations in regions with specific geometry or context might be significant. Examples of constraints include prior information or beliefs based on past observations, environmental conditions, state of the manufacturing process, supplier information, other real-time information, design information, material properties, object geometry etc. Such constraints are either applied as a post-processing step or maybe incorporated into the design of variations.

Based on the analysis at 25, at 24 then metrology sites are determined. In some embodiments, this may involve human interaction based for example on the visualization shown in FIG. 5D. In other embodiments, metrology sites forming a metrology blueprint may be obtained automatically. This may be achieved either through constrained optimization or discriminative learning.

Constrained optimization involves determining a subset of measurements that satisfy a set of constraints. Constraints may include a minimum/maximum number of measurements, may involve both near and far range measurements are made (i.e. both measurements between parts of the objects being close together and between parts of the objects further apart), may involve detection, may involve equal coverage from all regions of the objects or may involve a so-called "sanity check". A sanity check is a basic test to quickly evaluate whether a claim or the result of a calculation can possibly be true. This can be obtained by using greedy methods that incrementally construct a subset based on logically best configuration as described for example in D. J. Williams and M. Shah, "A fast algorithm for active contours and curvature estimation," CVGIP: Image Understanding. 1992. Gradient descent approaches can also be constructed through reinforcement learning as explained in Sutton, Richard S., and Andrew G. Barto. Introduction to reinforcement learning. Vol. 135. Cambridge: MIT press, 1998 or weakly or supervised learning as in Christopher M. Bishop. Pattern Recognition and Machine Learning. Berlin, Heidelberg: Springer-Verlag Berlin, 2006 if a rewards/loss function can be defined. Interactive learning where a human operator accepts a reject recommendation by the analysis device can be employed to train the analysis device, as explained above. The learning process may be improved through priors on usefulness of measurements, i.e. prior knowledge. Data augmentation by simulation or resamples for example using the above mentioned GANs may also be employed.

In the second approach, discriminative models may be used for inferring metrology sites at 24, which are trained by machine learning techniques. A discriminative model is an entity (for example a trained neural network or the like) generally applied to classification problems as described in Christopher M. Bishop, "Pattern Recognition and Machine Learning", Berlin, Heidelberg: Springer-Verlag Berlin, 2006. For example, a set of good structures (i.e. acceptable structures) and bad structures (defective products) may be provided as training data for training the discriminative model, and the metrology sites may then be selected by the discriminative classifier to enable separation of the good structures from the bad structures. In other words, the discriminative classifier selects metrology sites or measurements that correlates with separating good from bad structures.

Figure 5E:
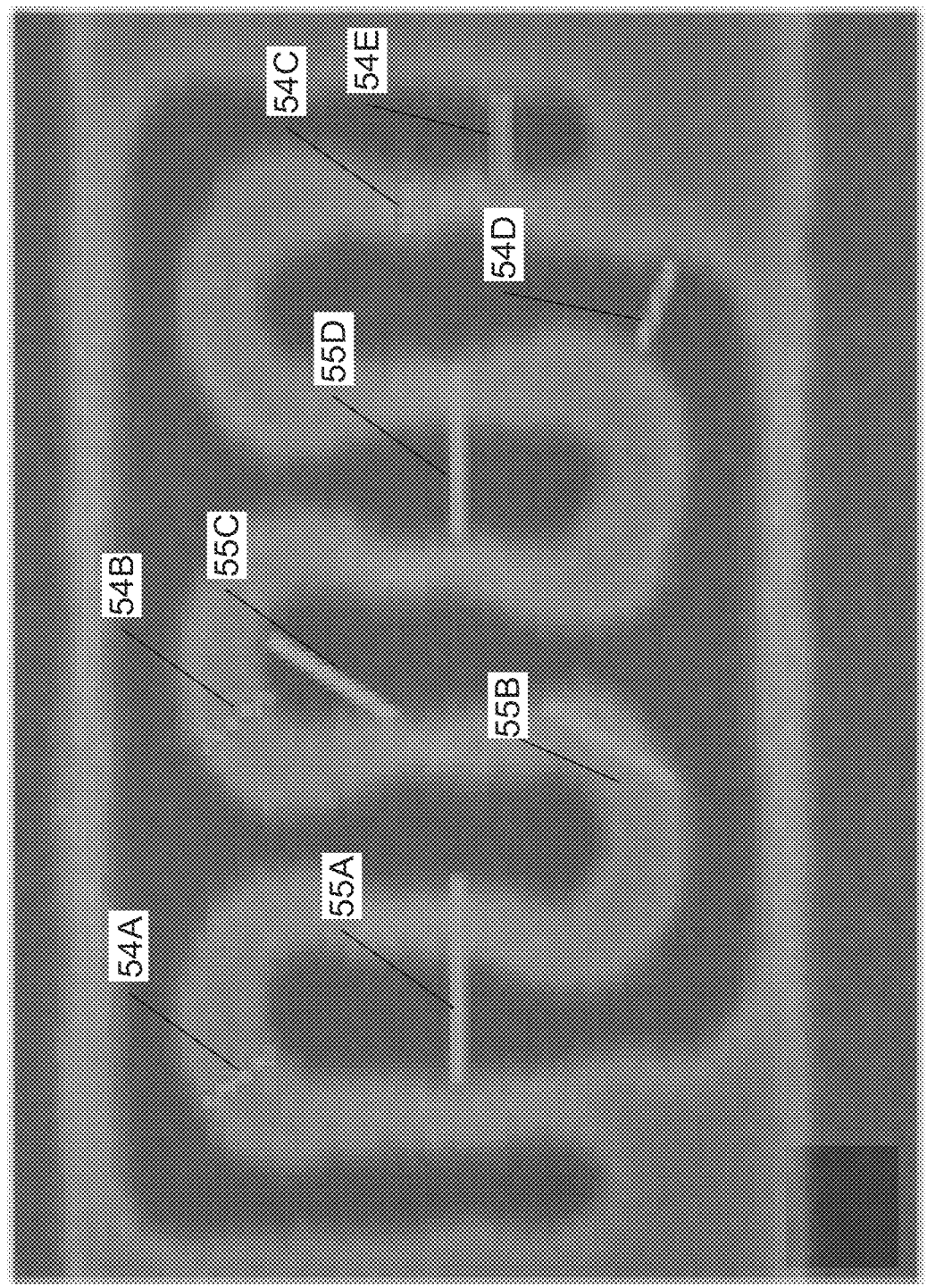

An example result is shown in FIG. 5E. Here, metrology sites 54A to 54D representing shorter range distances within parts of the objects and metrology sites 55A to 55D corresponding to longer range distances between different parts of the structure may be used. This may be used as a metrology blueprint giving end point of distances to be measured, lengths of distances to be measured and the use of the respective measurements (a measurement for identifying products out of range, so-called outliers, measurements for sanity checks etc.). In other words, the quantities shown in FIG. 5E may then be measured in product inspections of final products for example to detect defective products. Alternatively, if human interpretability needs to be preserved, measurements that reflect human-perceivable metrics such as width, height, angles etc. can be extracted.

FIG. 3 illustrates a further embodiment for inferring metrology sites. Similar to the method of FIG. 2, measurement data is received as an input, and an object detection 20 and alignment 21 is performed, as in the method of FIG. 2. Based on the aligned objects, an analysis is performed at 35. This analysis includes what is referred to as "semantic understanding" herein at 32. Semantic understanding refers to a process where high level information about the objects in inferred, for example a type of a structure used. For example, in structures on a semiconductor wafer, the high level information may indicate if a region is a via (vertical interconnect), a contact pad, part of the substrate etc. This essentially corresponds to a segmentation of the objects according to various criteria.

Such a segmentation based on functionality may for example be performed using fully convolutional networks as described in Long, Jonathan, Evan Shelhamer, and Trevor Darrell. "Fully convolutional networks for semantic segmentation." CVPR. 2015. The criteria include material type (substrate, metal etc.), geometry type (cylindrical, spherical, planar etc.), surface information (roughness, curvature, surface normals etc.) and metrology prior (measurement neighborhood prior, i.e. near range or far range measurements). Similar classifications can be performed for other kinds of measurements like spectra (for example regions of high amplitude and of low amplitude, high frequency components or low frequency components etc.).

In embodiments, for this segmentation again machine learning techniques may be used, e.g. to train a classifier for providing the segmentation. Similarly to the object detector, these methods can be trained interactively as e.g. in Jakob Santner, Thomas Pock, Horst Bischof. "Interactive Multi-Label Segmentation". ACCV 2010.

Figures 5F, 5G:
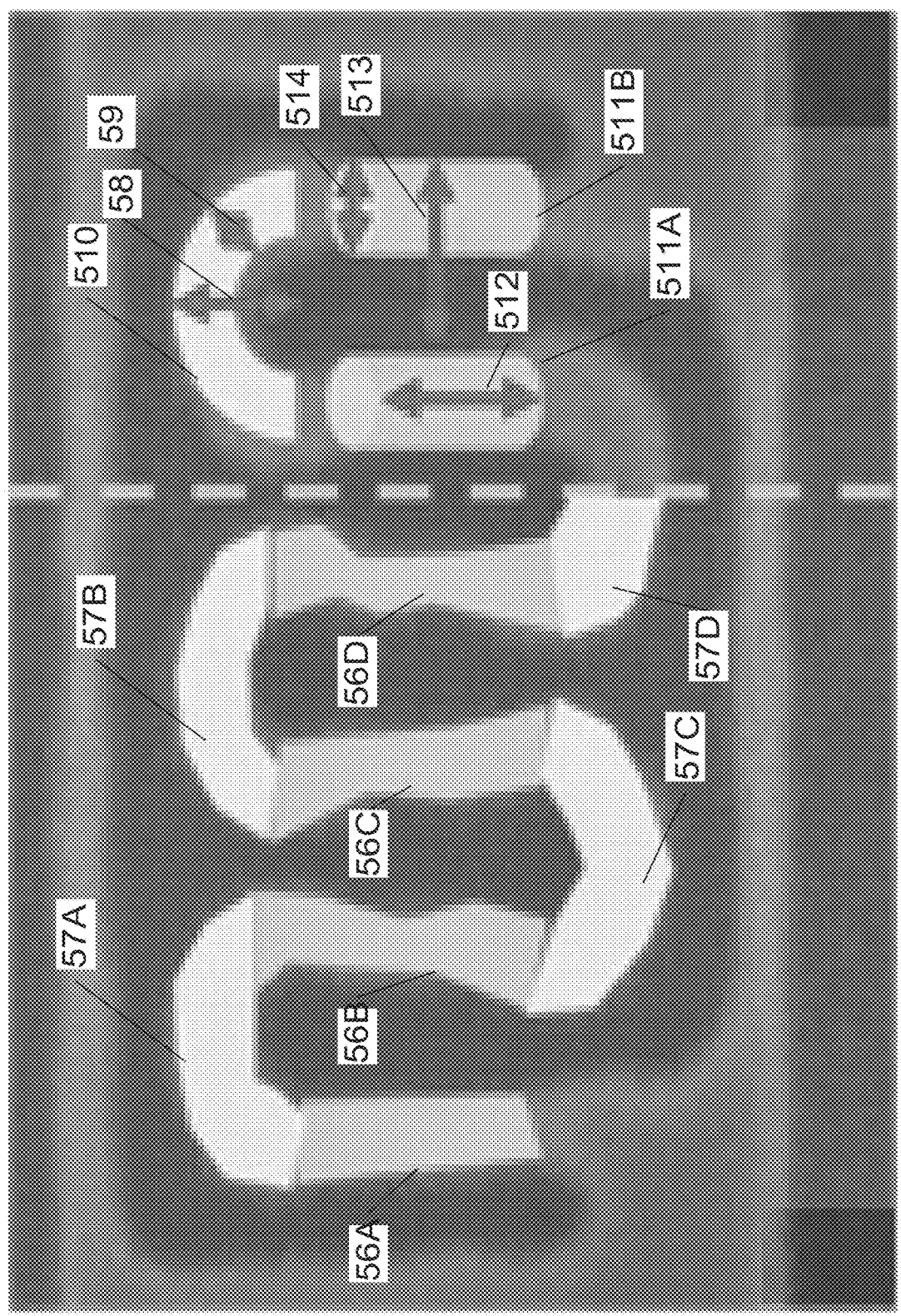

A simple example for this semantic understanding is shown in FIG. 5F. Here, by using training data to train analysis device 12, an identification of essentially straight segments 56A to 56D and of curved segments 57A to 57D is performed. This is just a simple example based on geometry, and as mentioned above the segmentation may be performed based on other criteria discussed above.

At 33, then prior models, i.e. predefined elements, are provided to the objects of which the semantic understanding has been inferred at 32. In this case, previous beliefs or knowledge about favorable metrology sites based on the semantic understanding is utilized. For example, based on geometry, certain simple geometric figures may be fitted to the identified structures. Also, measurement scale (low range and far range measurements), neighborhood constraint (for example constraints for distances between certain features like vias, knowledge about past experience like most common measurement types from previous measurements and measurement type (tradeoff between outlier detection and sanity check) may be used. An example is shown in FIG. 5G, where cylinders 511A, 511B are fitted to straight portions like straight segments 56A to 56D are fitted, and a semicircle 510 is fitted to curve segments like segments 57A to 57D. From these geometric elements then metrology sites may be inferred, like cylinder height 512, cylinder diameter 514, distance between neighboring cylinder 513, radius 58 of semicircle 510 or diameter of the semicircle segment. Otherwise, the comments regarding the inferring of measurements metrology sites made with respect to FIG. 2 may also be used for the method of FIG. 3. This is performed at 24 in FIG. 3.

The methods of FIG. 5 and FIGS. 2 and 3 both may be implemented using some human interaction, but may also be implemented fully or largely automatized. In each case, various techniques, in particular machine learning techniques, may be used to support inferring of metrology sites. Moreover, the methods may also be combined. For example, both the analysis at 25 and the analysis at 35 may be performed, and the results may be combined and/or compared. Therefore, the discussed embodiments are not to be construed as limiting.

What is claimed is:

1. A method, comprising:
   using one or more machine-readable hardware storage devices which comprise instructions that are executable by one or more processing devices to perform operations comprising:
   detecting a plurality of objects in measurement data obtained from one or more product samples;
   aligning the plurality of detected objects; and
   analyzing the plurality of aligned objects to determine metrology sites for a product.

2. The method of claim 1, wherein the measurement data comprises at least one member selected from the group consisting of a two-dimensional image, a three-dimensional image, scanning electron microscopy measurement data, computer tomography measurement data, spectroscopic measurement data, and acoustic measurement data.

3. The method of claim 1, wherein detecting the plurality of objects comprises a template matching process.

4. The method of claim 1, wherein detecting the plurality of objects is based on machine learning.

5. The method of claim 4, further comprising providing an interface for human input in a training part of the machine learning.

6. The method of claim 1, wherein aligning the plurality of objects comprises bringing the plurality of objects into a common reference coordinate system.

7. The method of claim 1, wherein aligning the plurality of detected objects comprises finding corresponding descriptors in the plurality of detected objects.

8. The method of claim 7, wherein finding the descriptors is based on machine learning.

9. The method of claim 8, further comprising providing an interface for human input in a training part of the machine learning.

10. The method of claim 1, wherein analyzing the plurality of aligned objects comprises identifying regions of different variations between the plurality of aligned objects.

11. The method of claim 10, wherein identifying the regions of different variations comprises analyzing at least one parameter of the plurality of objected selected form the group consisting of shape, contour, mesh, and texture.

12. The method of claim 10, wherein identifying regions of different variations comprises performing a principal component analysis.

13. The method of claim 10, further comprising visualizing the regions of different variations.

14. The method of claim 13, wherein visualizing the regions comprises generating a member selected form the group consisting of a heat map and a saliency map.

15. The method of claim 10, wherein determining the metrology sites comprises determining the metrology sites based on the regions of different variances.

16. The method of claim 1, wherein analyzing the plurality of aligned objects comprises segmenting the plurality of aligned objects based on semantic understanding.

17. The method of claim 16, wherein the semantic understanding is based on semantic information comprising at least one member selected from the group consisting of a functionality of an object region, a material type of an object, a geometry type of an object region, surface properties of an object region, and prior metrology information.

18. The method of claim 16, further comprising fitting predefined elements to the plurality of segmented objects.

19. The method of claim 18, wherein the predefined elements comprise geometric elements.

20. The method of claim 18, wherein determining metrology sites comprises at least one member selected from the group consisting of selecting dimensions of the predefined elements and selecting dimensions between the predefined elements.

21. The method of claim 1, wherein determining metrology sites comprises solving a constraint optimization problem.

22. The method of claim 1, wherein determining metrology sites is based on machine learning techniques.

23. The method of claim 22, further comprising providing an interface for human input in a training part of the machine learning.

24. The method of claim 1, wherein prior knowledge from previous measurements is used for at least one member selected from the group consisting of detecting, aligning and analyzing.

25. The method of claim 1, wherein a classification using a trained classifier is performed for at least one member selected from the group consisting of detecting, aligning and analyzing.

26. One or more machine-readable hardware storage devices comprising instructions that are executable by one or more processing devices to perform operations comprising:
- detecting a plurality of objects in measurement data obtained from one or more product samples;
- aligning the plurality of detected objects; and
- analyzing the plurality of aligned objects to determine metrology sites for a product.

27. A system comprising:
- one or more processing devices; and
- one or more machine-readable hardware storage devices comprising instructions that are executable by the one or more processing devices to perform operations comprising:
  - detecting a plurality of objects in measurement data obtained from one or more product samples;
  - aligning the plurality of detected objects; and
  - analyzing the plurality of aligned objects to determine metrology sites for a product.

* * * * *

UNITED STATES PATENT AND TRADEMARK OFFICE
CERTIFICATE OF CORRECTION

PATENT NO. : 11,436,506 B2
APPLICATION NO. : 16/807581
DATED : September 6, 2022
INVENTOR(S) : Abhilash Srikantha et al.

Page 1 of 1

It is certified that error appears in the above-identified patent and that said Letters Patent is hereby corrected as shown below:

In the Specification

Column 2, Line 22, delete "convolu-tional" insert -- convolutional --;

Column 2, Line 47, delete "Smoulders." insert -- Smeulders. --;

Column 6, Line 27, delete "convolu-tional" insert -- convolutional --;

Column 11, Lines 21-22, delete "constraint (for example" insert -- constraint, for example --.

Signed and Sealed this
First Day of November, 2022

Katherine Kelly Vidal
*Director of the United States Patent and Trademark Office*